(12) United States Patent
Stiscia et al.

(10) Patent No.: US 10,236,992 B2
(45) Date of Patent: Mar. 19, 2019

(54) APPARATUS AND METHODS FOR MITIGATING WAVELENGTH DRIFT IN AN OPTICAL COMMUNICATION NETWORK

(71) Applicant: Nokia Solutions And Networks Oy, Espoo (FI)

(72) Inventors: James J. Stiscia, Garner, NC (US); Travis S Lentz, Raleigh, NC (US)

(73) Assignee: Nokia Solutions And Networks Oy, Espoo (FI)

( * ) Notice: Subject to any disclaimer, the term of this patent is extended or adjusted under 35 U.S.C. 154(b) by 0 days.

(21) Appl. No.: 15/476,496

(22) Filed: Mar. 31, 2017

(65) Prior Publication Data

US 2017/0288773 A1    Oct. 5, 2017

Related U.S. Application Data

(60) Provisional application No. 62/316,034, filed on Mar. 31, 2016, provisional application No. 62/437,437, filed on Dec. 21, 2016, provisional application No. 62/437,363, filed on Dec. 21, 2016.

(51) Int. Cl.
| | | |
|---|---|---|
| *H04B 10/27* | (2013.01) | |
| *H04B 10/572* | (2013.01) | |
| *H04Q 11/00* | (2006.01) | |
| *H04B 10/079* | (2013.01) | |
| *H04J 14/02* | (2006.01) | |

(52) U.S. Cl.
CPC ..... *H04B 10/572* (2013.01); *H04B 10/07955* (2013.01); *H04B 10/27* (2013.01); *H04J 14/0221* (2013.01); *H04J 14/0257* (2013.01); *H04J 14/0282* (2013.01); *H04Q 11/0066* (2013.01)

(58) Field of Classification Search
CPC combination set(s) only.
See application file for complete search history.

(56) References Cited

U.S. PATENT DOCUMENTS

2006/0088319 A1*  4/2006  Morton ............... H04B 10/506
                                                        398/79
2010/0329685 A1* 12/2010  Zheng ................... G02F 1/0147
                                                        398/83

(Continued)

*Primary Examiner* — David C Payne
*Assistant Examiner* — Omar S Ismail
(74) *Attorney, Agent, or Firm* — Loza & Loza, LLP; Jessica W. Smith

(57) ABSTRACT

An apparatus and method for mitigating wavelength drift in an optical communication network. A network node such as an OLT in a PON receives a transmission on a certain optical channel. The received signal is of course sent to a receive module for processing the data contained therein, and may be sent to an RSSI module for signal strength analysis. A portion of the received transmission, however, is directed to a wavelength control section where it is divided into at least a first path and a second path, the second path having a wavelength discriminator filter. The light propagating along each path is converted to an electrical signal and digitized for comparison by a microcontroller. The microcontroller calculates one or more power ratios and from this determines the receive signal wavelength. This wavelength is compared to the wavelength of a selected channel to determine what if any adjustments should be made.

19 Claims, 5 Drawing Sheets

(56) References Cited

U.S. PATENT DOCUMENTS

2014/0363157 A1* 12/2014 Ruchet ............... H04B 10/079
    398/38
2015/0063812 A1* 3/2015 Dove .................. H04B 10/40
    398/67
2016/0112140 A1* 4/2016 Rahn .................. H04B 10/0775
    398/79

* cited by examiner

APPARATUS AND METHODS FOR MITIGATING WAVELENGTH DRIFT IN AN OPTICAL COMMUNICATION NETWORK

CROSS-REFERENCE TO RELATED APPLICATIONS

This provisional application is related to and claims the benefit of U.S. Provisional Application No. 62/316,034, filed on 31 Mar. 2016, and of U.S. Provisional Application No. 62/437,437, filed on 21 Dec. 2016, and of U.S. Provisional Application No. 62/437,363, filed on 21 Dec. 2016, the entire contents of each of which are incorporated herein by reference.

BACKGROUND

Field of the Disclosure

The present disclosure relates generally to network communication and, more particularly, to a manner of controlling wavelength drift advantageously applied to burst mode transmissions in an optical communication network.

Description of the Related Art

The following abbreviations are herewith expanded, at least some of which are referred to within the following description.
  APC Automatic Power Control
  ASE Amplified Spontaneous Emission
  BM Burst Mode
  CO Central Office
  DFB Distributed FeedBack
  EDFA Erbium-Doped Fiber Amplifier
  EML Electro-absorption Modulation Laser
  GPON Gigabit PON
  IEEE Institute of Electrical and Electronics Engineers
  ITU International Telecommunication Union
  MSE Mean Squared Error
  NG-PON2 Next-Generation PON2
  OLT Optical Line Terminal
  ONT Optical Network Terminal
  ONU Optical Network Unit
  PON Passive Optical Network
  RS Reed-Solomon
  RSSI Received Signal Strength Indication
  TEC Thermo-Electric Control
  WDM Wavelength Division Multiplexer/demultiplexer
  WM Wavelength Multiplexing/demultiplexing module One example of an optical network is a PON (passive optical network). A PON uses modulated optical signals transmitted over a fiber optic cable to communicate between two or more network nodes. It is "passive" because it typically requires no power input along the communication path between the transmitting and receiving nodes. In a common implementation one node is an OLT located in a service provider's central office communicating with a number of ONTs, each located at a subscriber premises. A splitter/combiner located between them distributes the downstream signal from the OLT and combines upstream ONT transmissions onto a single fiber for the OLT.

In such a scenario, upstream and downstream optical transmissions often use different wavelengths to avoid interfering with one another. In addition, upstream transmissions are typically done according to a schedule established by the OLT. Each ONT buffers its upstream transmissions until sending them in a burst when its allocated time slot opens.

The light signals transmitted in a PON are often produced by lasers or similar devices. Lasers are well-suited to this purpose but do have some drawbacks. One disadvantage is that a laser generates heat as it operates and this heating may cause the wavelength to drift from its original setting. If the wavelength drifts too far it may interfere with other signals or become more difficult to detect. This problem may be especially expected when an ONT laser is operating in burst mode.

These and other problems are addressed by the system, apparatus, and method of the present invention. Although provided as background for describing the present invention, no implication or admission is made or intended that the information herein is known to others besides the inventors.

SUMMARY OF EMBODIMENTS

The following presents a summary in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is provided later.

In one aspect, a method for mitigating the effects of wavelength drift in an optical communication network includes dividing a received light beam into at least a first portion and a second portion, converting the first portion into an electrical signal and digitizing the first portion electrical signal, wavelength-discriminator filtering the second portion, wherein the wavelength-discriminator filtering comprises producing as output an optical signal having an amplitude proportional to the received wavelength, converting the filtered second portion into an electrical signal, and digitizing the second portion electrical signal. The method may further include comparing the digitized signal from the first path with the digitized signal from the second path to calculate a power ratio and determining a wavelength adjustment as a function of at least the power ratio.

In this aspect, the method may be executed by a network node, for example, an OLT in a PON. The method may further include performing the comparing step a plurality of times during the transmission so that the wavelength adjustment is determined from a plurality of calculated power ratios. Channel-selection filtering may be performed on at least a portion of the received light to remove any frequency components present in channels adjacent to a selected channel. The channel-selection filtering may be performed prior to dividing the light beam into at least a first portion and a second portion, or may be performed only with respect to light propagating along the first path.

In some embodiments, determining the wavelength adjustment may include determining the wavelength of the received light beam, for example by comparing the power ratio to a data table.

In some embodiments the method may further include executing the wavelength adjustment, for example by sending an upstream transmission schedule to the source of the upstream transmission. The upstream transmission schedule many indicate, for example, relatively shortened burst mode transmissions by upstream transmission source to avoid undue wavelength drift. It may also include directions to the source node to make adjustments, for example directing the source of the upstream transmission to adjust the temperature of the light source.

In another aspect a network node includes an optical port for receiving an optical transmission, a power divider for dividing the received optical transmission into at least two portions and directing a first portion to a first path and a second portion to a second path, an O/E converter on the first path configured to convert the light propagating on the first path into an electrical signal, an A/D converter on the first path configured to digitize the electrical signal from the first path O/E converter, a wavelength discrimination filter on the second path configured to output an optical signal having an amplitude proportional to the received wavelength, an O/E converter on the second path configured to convert the light propagating on the second path into an electrical signal, an A/D converter on the second path configured to digitize the electrical signal from the second path O/E converter, a microcontroller arranged to receive the respective signals produced by the first path A/D converter and the second path A/D converter and configured to calculate a power ratio, and a memory device connected to the microcontroller. In this aspect the network node may be an OLT.

In some embodiments, the microcontroller is further configured to determine a wavelength adjustment as a function of at least the power ratio, and in some implementations at least a plurality of power ratios calculated during a received transmission. The network node may also include a channel selection filter configured to remove any frequency components present in channels adjacent to a selected channel. In such an embodiment, the channel selection filter may be, for example, on the first path between the power divider and the first path O/E converter, or alternately between the optical port and the power divider. The network node may in some cases also include an amplifier, for example an SOA, for amplifying the received transmission and an ASE filter. The ASE filter may be a separate component or may, for example, be included in the channel selection filter.

Additional aspects of the invention will be set forth, in part, in the detailed description, figures, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Various exemplary embodiments will now be described, and in general they are directed to an advantageous manner of providing wavelength-drift mitigation in an optical communication network, for example a PON (passive optical network). Note that the term "PON" is herein intended to be inclusive of all such networks, including for example GPON, EPON, XG-PON, and NGPON2. And again, the solutions presented herein may also be employed in other types of optical networks.

Figure 1:
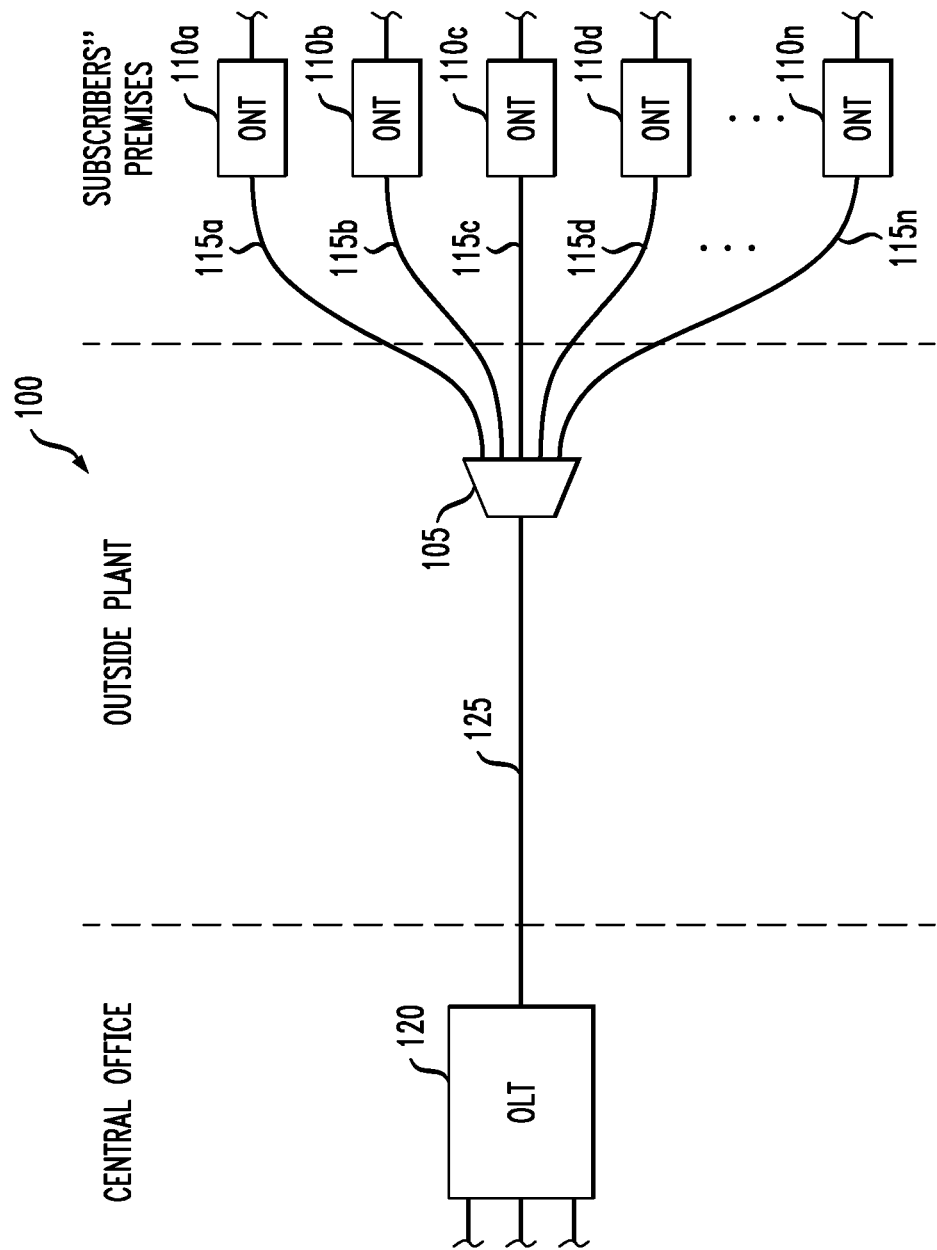
FIG. 1 is a schematic diagram illustrating selected components of an exemplary PON in which some embodiments may be advantageously implemented.

FIG. 1 is a simplified schematic diagram illustrating selected components of a typical PON 100 in which embodiments of the present invention may be implemented. Note that PON 100 may, and in many implementations will, include additional components, and the configuration shown in FIG. 1 is intended to be exemplary rather than limiting. Five ONTs, 110a through 110n, are shown, although in a typical PON there may be many more or, in some cases, fewer. In this illustration, each of the ONTs are presumed to be located at and serving a different subscriber, perhaps at their respective residences or other premises. The ONT at each location is connected or connectable to a device of the subscriber, or to a network of such devices (not shown). The term "ONT" is herein intended to include ONUs and similar devices as well.

PON 100 also includes an OLT 120, which communicates directly or indirectly with various sources of content and network-accessible services (not shown) that are or may be made available to the subscribers associated with PON 100. As should be apparent, OLT 120 handles the communications between these other entities and the ONTs. OLT 120 may also be involved in regulating the PON and individual ONTs. As mentioned above, the OLT 120 is typically located at a service provider location referred to as a central office. The central office may house multiple OLTs (not separately shown), each managing their own respective PON.

OLT 120 is in at least optical communication with each of the ONTs in the PON 100. In the embodiment of FIG. 1, OLT is connected with the ONTs 110a through 110n via a (feeder) fiber optic cable 125 and (access) fiber optic cables 115a through 115n. In this PON, a single splitter 105 is used to distribute a downstream transmission so that each ONT receives the same downstream signal. In this case, each ONT extracts and uses only its own portion of the downstream transmission.

In other optical networks, the splitter may also separate the signal into different wavelengths, if used, associated with each or various of the respective ONTs. The splitter in a PON is typically a passive element requiring no power. The splitter may be located, for example, in a street-side cabinet near the subscribers it serves (FIG. 1 is not necessarily to scale). This cabinet or similar structure may be referred to as the outside plant. Note, however, that no particular network configuration is a requirement of the present invention unless explicitly stated or apparent from the context.

In the example of FIG. 1, the splitter may also serve as a combiner for combining upstream traffic from the ONTs 110a through 110n to the OLT 120. Upstream transmissions are generally at a different wavelength (or wavelengths) than those of downstream transmissions to avoid interference. In addition, each ONT may be assigned a separate time slot, that is, a schedule for making upstream transmissions. This means that ONT upstream transmissions are often bursty in nature as the data is buffered for transmitting when the assigned time slot opens.

Unfortunately, as alluded to above, using burst-mode transmissions frequently introduces the problem of wavelength drift, which is especially a problem where constraints imposed on the network tend to be intolerant of significant drift. In most implementations there is a tradeoff between high (or sufficient) power output and "tight" wavelength control.

Figure 2:
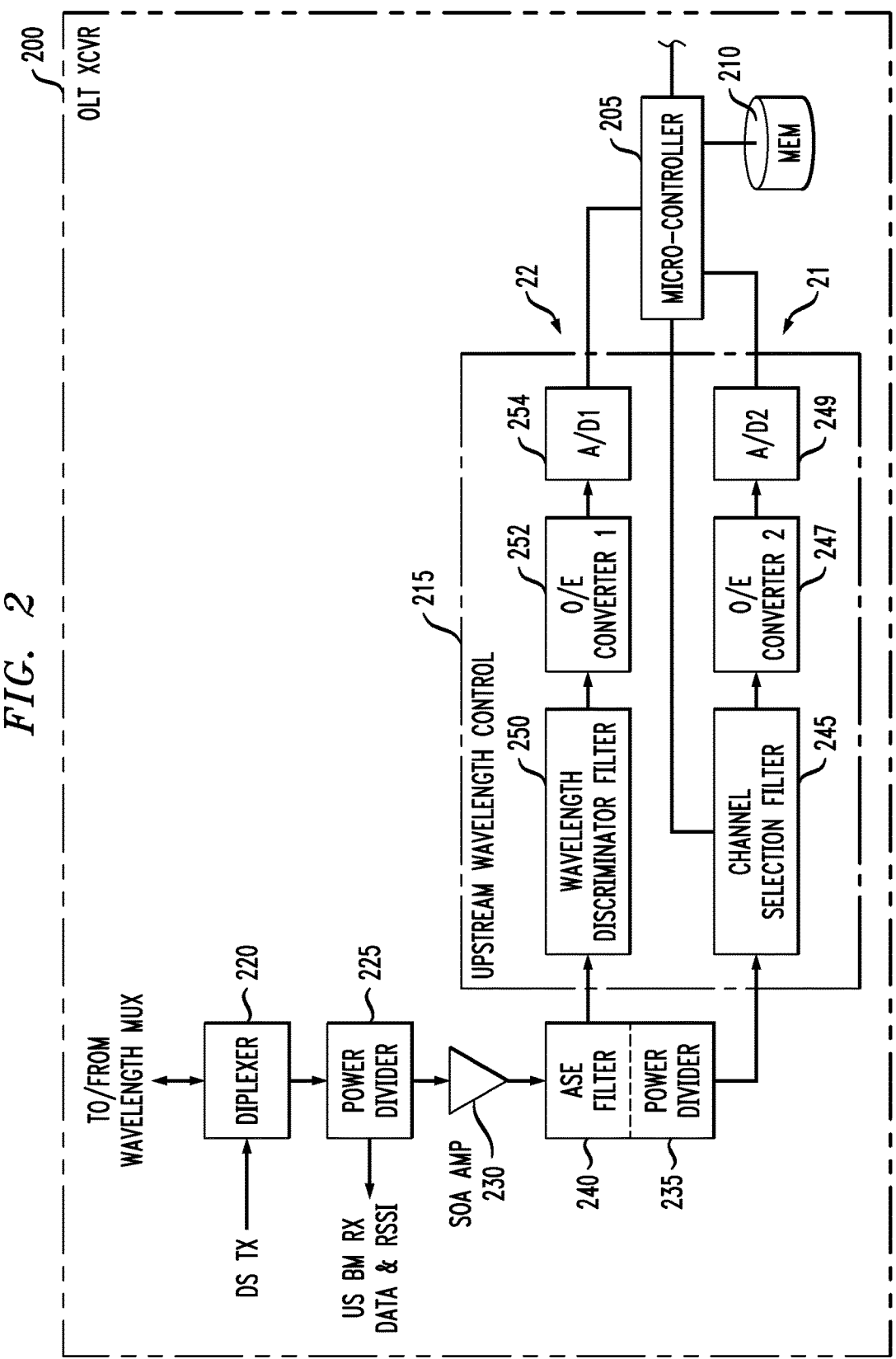
FIG. 2 is a block diagram illustrating selected components of an exemplary OLT according to some embodiments.

Wavelength drift may be mitigated by improvements in ONT, OLT, or both. Described herein is a novel OLT for use in wavelength-drift mitigation FIG. 2 is a block diagram illustrating selected components of an exemplary OLT 200 according to some embodiments. In this embodiment, OLT 200 includes a diplexer 220 to enable upstream and downstream transactions to us the same optical port and feeder fiber. The diplexer 220 directs downstream transmissions from a transmission module (not shown) to the optical port and upstream transmissions received at the optical port to the receive module (also not shown) and to various management and control apparatus.

In this embodiment, a power divider 225 receives upstream transmissions passed by the diplexer 220 and divides the incoming light signal into at least two portions. One portion is directed to the train of processing components in the receive module and to an RSSI module (not shown) for analyzing the signal strength of the received signal. Another portion is directed toward upstream wavelength control section 215 that will be described in further detail below. In general, upstream wavelength control section 215 attempts to provide greater ability for the OLT or similar management node to make wavelength corrections and mitigate wavelength drift.

In the embodiment of FIG. 2, the light directed to the upstream wavelength control section 215 is first amplified by, in this case, SOA 230 and filtered by an ASE filter 240. The resulting light signal is then provided to a power divider 235 where it is divided into at least two portions directed along separate paths through the wavelength control operation. Shown in FIG. 2 are a first path 21 and a second path 22.

In this embodiment, first path 21 includes a channel selection filter 245 configured to filter out any frequency components that may be present in channels other than the selected channel. Note that the channel selection filter may not be present in all embodiments. The first path 21 also includes an O/E (optical/electrical) converter 247 for converting the channel section filter output into an electrical signal, and an A/D (analog/digital) converter for digitizing the electrical signal before it is provided to microcontroller 205.

In the embodiment of FIG. 2, second path 22 includes a wavelength discriminator filter 250. The wavelength discriminator filter 250 provides an optical output signal amplitude proportional to the incoming wavelength of the optical signal. A typical PON may have a number of upstream channels available for scheduling upstream transmissions. The filter transfer function may be set to repeat for each of possible upstream PON channels. The second path 22 also includes an O/E converter 252 for converting the channel section filter output into an electrical signal, and an A/D converter for digitizing the electrical signal before it is provided to microcontroller 205.

In the embodiment of FIG. 2, microcontroller 205 coordinates or controls the operation of other components of OLT 200. Microcontroller 205 may be implemented in hardware or in software program instructions executing on a hardware device, or a combination of both. In this embodiment, the microcontroller is configured to calculate a power ratio representative of the electrical signals received from path 21 and path 22. This ratio is used to determine the wavelength of a received upstream signal. Memory device 210 is connected to microcontroller and may be used to store, for example, program instructions and data tables for use in the function of microcontroller 205. Memory 210 is non-transitory in the sense of not being merely a propagating signal, unless explicitly recited otherwise in a particular embodiment.

Figure 3:
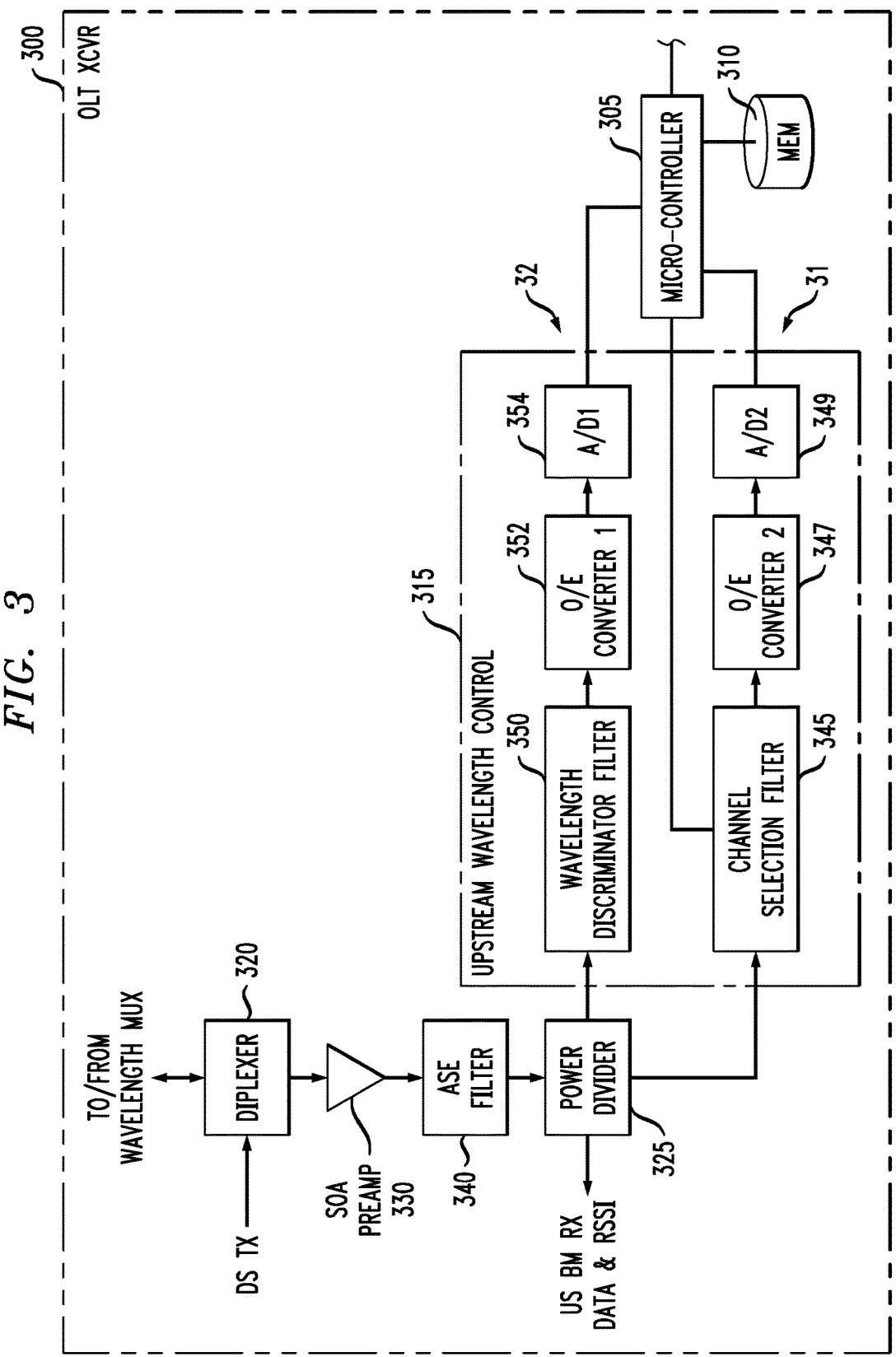
FIG. 3 is a block diagram illustrating selected components of an exemplary OLT according to some embodiments.

FIG. 3 is a block diagram illustrating selected components of an exemplary OLT 300 according to some embodiments. As should be apparent, OLT 300 is in many respects similar though not identical to OLT 200. In most cases, like components are numbered analogously. In the embodiment of FIG. 3, however, the received upstream optical signal is amplified by SOA 330 and filtered by ASE filter 340 prior to being provided to power divider 325. Power divider 325 of OLT 300 then divides the optical signal, directing portions to a receive module and an RSSI module (not shown) as well as to the first path 31 and second path 32 of wavelength control section 315. This embodiment may be advantageous, for example, where pre-amplification the light directed to the receive and RSSI sections is desired.

Figure 4:
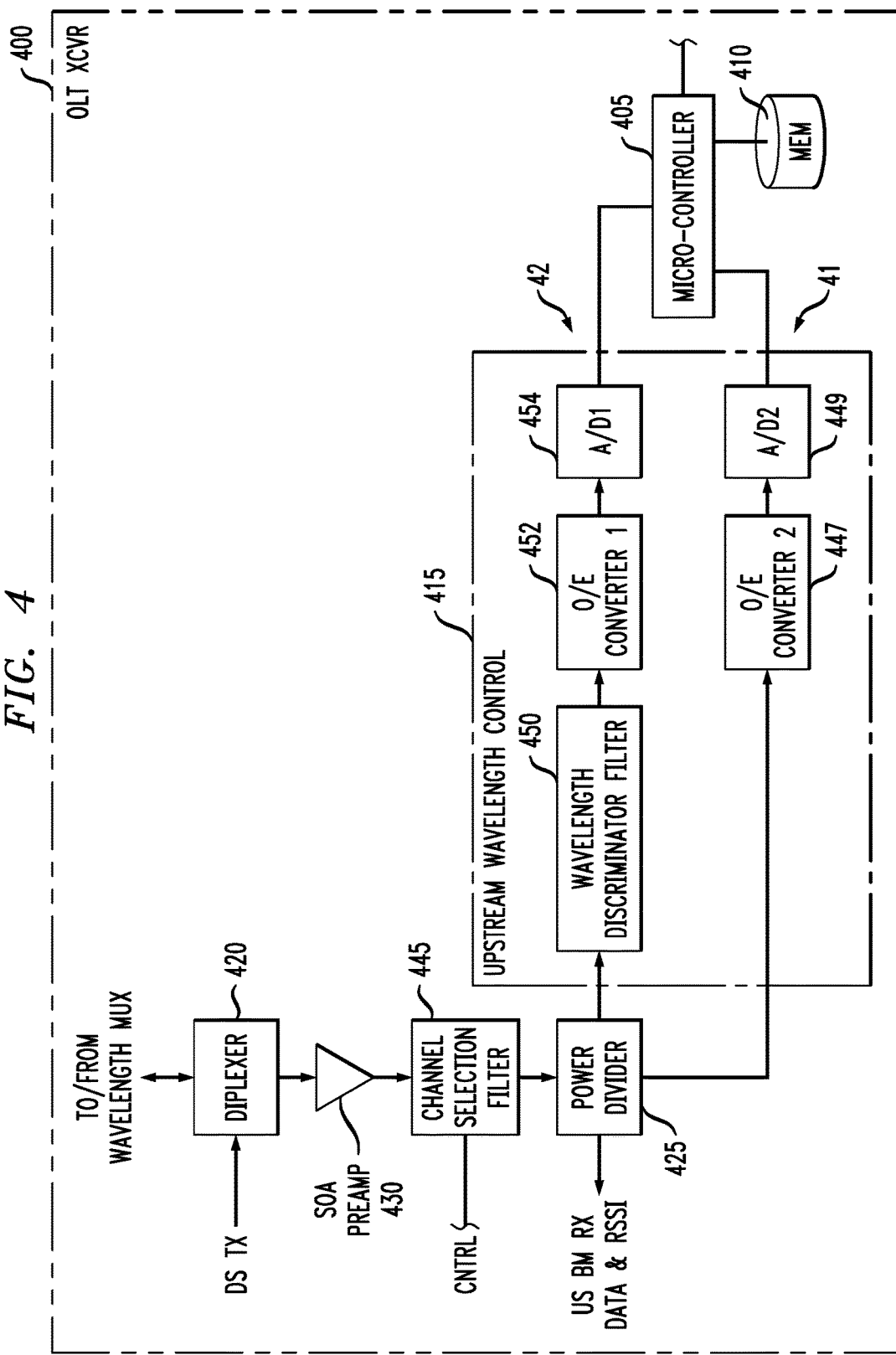
FIG. 4 is a block diagram illustrating selected components of an exemplary OLT according to some embodiments.

FIG. 4 is a block diagram illustrating selected components of an exemplary OLT 400 according to some embodiments. As should be apparent, OLT 400 is in many respects similar though not identical to OLTs 200 and 300, described above. In most cases, like components are numbered analogously. In the embodiment of FIG. 4, however, instead of being on the upstream wavelength control path 41, the channel selection filter 445 receives the amplified upstream signal from SOA 430 and provides it to the power divider 425. Note the channel selection filter 445 in this embodiment may still receive control signals from the microcontroller 405.

Note that FIGS. 2-4 illustrate selected components of their respective embodiments, and some variations are described above. Other variations are possible without departing from the claims of the invention as there recited. In some of these embodiments, illustrated components may be integrated with each other or divided into subcomponents. There will often be additional components in the OLT and in some cases components shown in one or more of FIGS. 2-4 will not be present. The illustrationed components may also perform other functions in addition to those described above.

Figure 5:
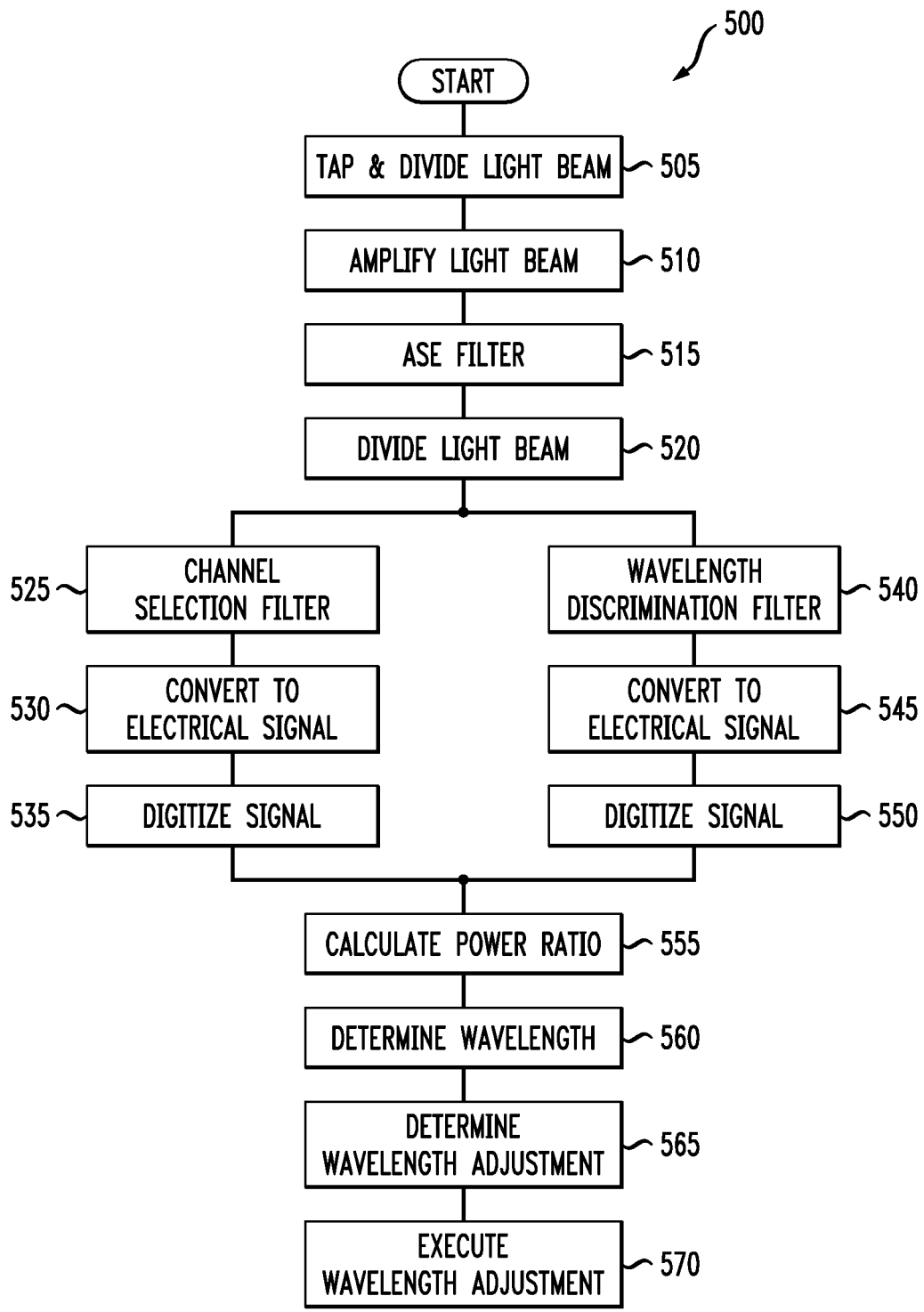
FIG. 5 is flow diagram illustrating a method of wavelength-drift mitigation according some embodiments.

FIG. 5 is flow diagram illustrating a method 500 of wavelength-drift mitigation according some embodiments. At START, it is presumed that the components necessary for executing this process are available and operational at least according to this embodiment. The process is here described in terms of an OLT in a PON with the understanding that it may also be implemented in similar optical communication networks having analogous devices. And although the method 500 is expected to have the greatest advantage when addressing upstream BM transmissions, it may be used in other scenarios as well.

An OLT receives upstream transmissions from the various ONUs that have been discovered and registered in the PON (not shown in FIG. 5). In the embodiment of FIG. 5, the process then begins with tapping or dividing a received light beam (step 505). A portion of the light, of course is directed to a receive train for processing. It may also be further tapped for the OLT to separately perform an RSSI analysis of the signal. In accord with this embodiment, a portion also is directed for wavelength control. This portion is amplified (step 510), for example by an SOA, in order to enhance the wavelength detection capability of this section.

In this embodiment, the amplified signal is then passed through an ASE (amplified spontaneous emission) filter (step 515) for ASE filtering before being provided to a power divider or similar component. Note that the ASE filter may not be present in all cases. In any case, the signal is then divided into two sub-portions that are respectively directed to two detection paths. In a first path, the applicable sub-portion is passed through a channel selection filter (step 525). The downstream device from which the signal is received has been assigned a channel for this transmission and the channel selection filter selects this channel and removes any frequency components that may be present in adjacent channels. Note that the channel selection filtering in this path may in some cases not be required, for example if a wavelength MUX providing the signal to the OLT itself includes and channel filter, and if the measurement SNR is adequate.

In the embodiment of FIG. 5, the light signal on the first path is then converted to an electrical signal (step 530), which is in turn provided to an A/D convertor for digitizing (step 535). The digitized signal is then presented to a microcontroller or similar device (not separately shown).

In this embodiment, the sub-portion of light directed to a second path is provided to a wavelength discriminator filter. The wavelength discriminator filter provides an optical output signal amplitude proportional to the incoming optical signal wavelength (step 540). The light signal on the second path is then converted to an electrical signal (step 545), which is in turn provided to an A/D convertor for digitizing (step 550). The digitized signal is then presented to a microcontroller or similar device (not separately shown).

In the embodiment of FIG. 5, microcontroller compares the power of the signal from the first path and the second path and calculates a power ratio (step 555). The power ratio may then be compared to a table or processed through an equivalent algorithm to determine the wavelength of the received signal (step 560). In one example, the discriminator filter may be chosen such that a power ratio of 1 indicates a received wavelength significantly above the applicable channel center wavelength. Centered wavelength values and values below that would produce different power ratios. Note that because the wavelength may drift as the transmission continues, steps 555 and 560 are preferably repeated a number of times to adequately profile this behavior.

In the embodiment of FIG. 5, a wavelength adjustment may then be determined (step 565). The adjustment could, of course, be zero if the received wavelength is centered in the channel or within acceptable tolerances, which may vary from one implementation to another. In determining the wavelength adjustment, the OLT may also take into account RSSI values, if measured, and an historical data available with respect to the ONT.

The wavelength adjustments are then executed (step 570). This may take any one or more of several forms. In some cases, the OLT will simply inform the ONT and direct it to make adjustments. As the OLT sets the transmission schedule, it may also schedule shorter bursts to avoid the drift beyond an acceptable limit. It may also change the assigned transmission frequency for the ONT.

Note that the sequence of operation illustrated in FIG. 5 represents an exemplary embodiment; some variation is possible within the spirit of the invention. For example, additional operations may be added to those shown in FIG. 5, and in some implementations one or more of the illustrated operations may be omitted. In addition, the operations of the method may be performed in any logically-consistent order unless a definite sequence is recited in a particular embodiment.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the sequence in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for mitigating the effects of wavelength drift in an optical communication network, comprising:
   dividing a received optical signal assigned to a selected channel into at least a first portion to propagate along a first path and a second portion to propagate along a second path;
   filtering at least the first portion of the optical signal assigned to the selected channel to pass a predetermined wavelength assigned to the selected channel and filter frequency components associated with other channels;
   converting the first portion into an electrical signal and digitizing the first portion electrical signal;
   wavelength discriminator filtering the second portion of the optical signal assigned to the selected channel, wherein the wavelength discriminator filtering comprises producing as output an optical signal having an amplitude proportional to the received wavelength;
   converting the filtered second portion into an electrical signal and digitizing the second portion electrical signal;
   comparing the digitized signal from the first path with the digitized signal from the second path to calculate a power ratio; and
   determining a wavelength adjustment as a function of at least the power ratio.

2. The method of claim 1, wherein the method is executed by a network node.

3. The method of claim 2, wherein the network node is an OLT.

4. The method of claim 1, further comprising performing the comparing step a plurality of times, wherein the wavelength adjustment is determined from a plurality of calculated power ratios.

5. The method of claim 1, wherein the channel selection filtering is performed prior to dividing the optical signal assigned to the selected channel into at least a first portion and a second portion.

6. The method of claim 1, wherein the channel selection filtering is performed only with respect to light propagating along the first path.

7. The method of claim 1, further comprising executing the wavelength adjustment.

8. The method of claim 7, wherein executing the wavelength adjustment comprises sending an upstream transmission schedule to the source of the upstream transmission.

9. The method of claim 7, wherein executing the wavelength adjustment comprises directing the source of the upstream transmission to adjust the temperature of the light source.

10. The method of claim 1, wherein determining the wavelength adjustment comprises determining the wavelength of the received light beam.

11. The method of claim 1, wherein determining the wavelength adjustment comprises comparing the power ratio to a data table.

12. An apparatus in an optical network for mitigating the effects of wavelength drift, comprising:
   a power divider configured to receive an optical channel and divide the optical channel into a first portion and a second portion, wherein the optical channel is assigned to a predetermined wavelength;
   a channel selection filter configured to filter at least the first portion of the optical channel to pass the predetermined wavelength and filter wavelength components associated with other channels to output a filtered first portion;
   a wavelength discriminator filter configured to receive the second portion of the optical channel and output a filtered second portion having an amplitude proportional to the received wavelength; and
   a microcontroller configured to:
      determine a first power of the filtered first portion and a second power of the filtered second portion; and
      determine a wavelength adjustment using the first power of the filtered first portion and the second power of the filtered second portion.

13. The apparatus of claim 12, wherein the apparatus is an optical line terminal (OLT) in a passive optical network and wherein the optical channel is received from an optical network terminal (ONT) over the passive optical network.

14. The apparatus of claim 12, wherein the microcontroller is further configured to perform a plurality of determinations of the first power of the filtered first portion and the second power of the filtered second portion during transmission of the optical channel, wherein the wavelength adjustment is determined from the plurality of determinations.

15. The apparatus of claim 12, wherein the channel selection filtering is further configured to filter the second portion of the optical channel to pass the predetermined wavelength and filter frequency components associated with other channels.

16. The apparatus of claim 12, wherein the microcontroller is further configured to:
   determine a power ratio of the first power of the filtered first portion and the second power of the filtered second portion; and
   compare the power ratio to a table to determine the wavelength adjustment.

17. The apparatus of claim 12, wherein the microcontroller is further configured to:
   direct another optical node to adjust a transmission wavelength of the optical channel in response to the wavelength adjustment.

18. The apparatus of claim 12, wherein the microcontroller is further configured to:
   direct another optical node to adjust a burst length of the optical channel in response to the wavelength adjustment.

19. An apparatus in an optical network for mitigating the effects of wavelength drift, comprising:
   a channel selection filter configured to:
      receive an optical channel assigned to a predetermined wavelength; and filter the optical channel to pass the predetermined wavelength and filter frequency components associated with other channels; and output a filtered optical channel;

a power divider configured to divide the filtered optical channel into a first portion and a second portion;

a wavelength discriminator filter configured to receive the second portion of the optical channel and output a filtered second portion having an amplitude proportional to the received wavelength; and a microcontroller configured to:

determine a first power of the first portion and a second power of the filtered second portion; and determine a wavelength adjustment as a function of the first power of the first portion and the second power of the filtered second portion.

* * * * *